United States Patent [19]

Mikalsen

[11] Patent Number: 4,636,803

[45] Date of Patent: Jan. 13, 1987

[54] SYSTEM TO LINEARLY SUPPLY PHASE CHANGE INK JET

[75] Inventor: Arthur Mikalsen, Carmel, N.Y.

[73] Assignee: Exxon Printing Systems, Inc., Brookfield, Conn.

[21] Appl. No.: 661,922

[22] Filed: Oct. 16, 1984

[51] Int. Cl.⁴ ........................ G01D 9/00; G01D 15/16

[52] U.S. Cl. ................................ 346/1.1; 346/140 R

[58] Field of Search ........ 340/140 R, 140 IJ, 140 PD, 340/75, 1.1; 106/20, 30, 31; 222/146.5, 4.3; 221/75, 279, 312 A

[56] References Cited

U.S. PATENT DOCUMENTS

| | | | |
|---|---|---|---|
| 320,811 | 6/1885 | Nake | 222/64 |
| 1,953,257 | 6/1885 | Peirce | 10/162 |
| 2,482,245 | 9/1949 | Childers | 312/97.1 |
| 2,528,945 | 11/1950 | Carpenter | 114/18 |
| 2,564,552 | 9/1951 | Verdery | 312/94 |
| 2,773,496 | 12/1956 | Czarnecki | 222/146.5 |
| 3,036,730 | 5/1962 | Newberry | 221/75 |
| 3,057,511 | 10/1962 | Mannhardt | 221/75 |
| 3,269,595 | 10/1964 | Krakmer et al. | 221/75 |
| 3,273,748 | 9/1966 | De Shon et al. | 221/75 |
| 3,294,281 | 10/1966 | Schlaf | 221/9 |
| 3,411,675 | 11/1968 | Wahl | 222/238 |
| 3,591,045 | 7/1971 | Sterreck | 221/75 |
| 3,601,281 | 9/1971 | Schlaf | 221/75 |
| 3,653,932 | 4/1972 | Berry | 346/140 PD |
| 3,680,736 | 8/1972 | Viessmann | 221/279 |
| 3,715,055 | 2/1973 | Kendrick et al. | 221/75 |
| 3,715,219 | 2/1973 | Kurz | 346/140 PD |
| 3,773,069 | 11/1973 | Rebeutisch | 222/146.5 |
| 3,828,971 | 9/1974 | Offutt et al. | 221/75 |
| 3,840,147 | 9/1974 | O'Neal et al. | 221/75 |
| 3,883,039 | 5/1975 | Wittern et al. | 221/75 |
| 3,929,255 | 12/1975 | Wittern et al. | 221/75 |
| 3,935,966 | 2/1976 | Pitel et al. | 221/75 |
| 3,952,915 | 4/1976 | Pitel et al. | 221/75 |
| 3,986,637 | 10/1976 | Wittern et al. | 221/75 |
| 3,999,682 | 12/1976 | Albright et al. | 221/75 |
| 4,061,245 | 12/1977 | Lotepeich | 221/75 |
| 4,084,725 | 4/1978 | Buscher | 221/75 |
| 4,149,653 | 4/1979 | Lennartson | 221/75 |
| 4,258,860 | 3/1981 | Boettcher | 221/75 |
| 4,363,422 | 12/1982 | Boettcher | 221/75 |
| 4,369,896 | 1/1983 | Boettcher | 221/75 |
| 4,385,713 | 5/1983 | Boettcher | 221/75 |
| 4,462,035 | 7/1984 | Koto | 346/76 PH |
| 4,539,568 | 9/1985 | Lewis | 346/140 PD |

*Primary Examiner*—E. A. Goldberg
*Assistant Examiner*—Mark Reinhart

[57] ABSTRACT

A series of solid state ink members extends in an elongated array above a heated ink reservoir for a phase change ink jet apparatus. The members then advance along a path extending through the elongated array to a discharge location at one end of the path whereupon the members are dropped into the reservoir for melting. By threadedly engaging the members in pellet form with a rotatable drive, or threadedly engaging a drive member by the threaded drive shaft, the members may be suitably pushed along the path. In the alternative, the hot melt ink may take a granular form and be advanced by a rotatable, auger-like surface.

34 Claims, 10 Drawing Figures

SYSTEM TO LINEARLY SUPPLY PHASE CHANGE INK JET

BACKGROUND OF THE INVENTION

This invention relates to an ink jet wherein the ink employed within the jet is of the phase change type, which may be referred to as hot melt ink.

A phase change, or hot melt ink, of the type utilized in an ink jet is characteristically solid at room temperature. When heated, the ink will melt to a consistency so as to be jettable. A hot melt ink jet apparatus and method of operation are disclosed in copending application Ser. No. 610,627, filed May 16, 1984.

An ink jet apparatus consumes ink at a rate so as to make automatic ink loading desirable, thereby minimizing operator intervention. In copending application Ser. No. 660,657, filed Oct. 15, 1984, now abandoned, and its continuation Ser. No. 854,332 filed Apr. 21, 1986 ink pellet loading is accomplished utilizing a cartridge for sequentially advancing pellets to a loading position.

In many instances, an ink jet apparatus may have topographical considerations which limit the size and/or configuration of the cartridge. At the same time, it is desirable to have the cartridge be sufficiently large to permit continuous operation of the ink jet apparatus over an extended period of time. It is also important that the cartridge be reliable so as to ensure the proper delivery of ink to the heated reservoir of the hot melt ink jet apparatus at the appropriate time.

SUMMARY OF THE INVENTION

It is an object of this invention to provide a hot melt ink delivery system which accommodates the topographical considerations of a hot melt ink jet apparatus.

It is also an object of this invention to provide a hot melt ink delivery system with an adequate supply.

It is a still further object of this invention to provide a hot melt ink jet delivery system wherein ink is reliably delivered to the hot melt ink jet apparatus.

In accordance with these and other objects of the invention, a series a solid-state ink members extends in an elongated array above the heated ink reservoir for the apparatus. The members then advance along a path extending through the elongated array to a discharge location at one end of the path whereupon the members are dropped into the reservoir.

In the various embodiments of the invention, the members are pushed along the path. This may be accomplished by threadedly engaging the members in pellet form with a rotatable drive or threadedly engaging a drive member by the threaded drive shaft. In the alternative, the hot melt ink may take a granular form and be advanced by a rotatable, auger-like surface.

Where the solid-state members comprise pellets, an opening extending along the axis of elongation of the pellets at the surface of the pellets may be provided so as to permit the drive shaft to extend therethrough with or without threads. Preferably, the pellets have substantially uniform cross-sectional areas transverse to the axis of elongation so as to maintain the pellets in an aligned condition. The exterior of the pellets may comprise one or more flat surfaces which extend substantially parallel with the axis of elongation, or an arcuate surface about an axis parallel with the axis of elongation.

In an alternative embodiment, a rotatable drive member may take the form of a helix with each turn of the helix pushing a different pellet toward the discharge location. Preferably, such a pellet has at least one rounded extremity.

In the other embodiment of the invention wherein the solid-state ink is in granular form, the member extending along the path of advancement for the ink comprises an auger-like surface. As the auger-like surface rotates, the granular matter is advanced to the discharge location.

DESCRIPTION OF PREFERRED EMBODIMENTS

Figure 1:
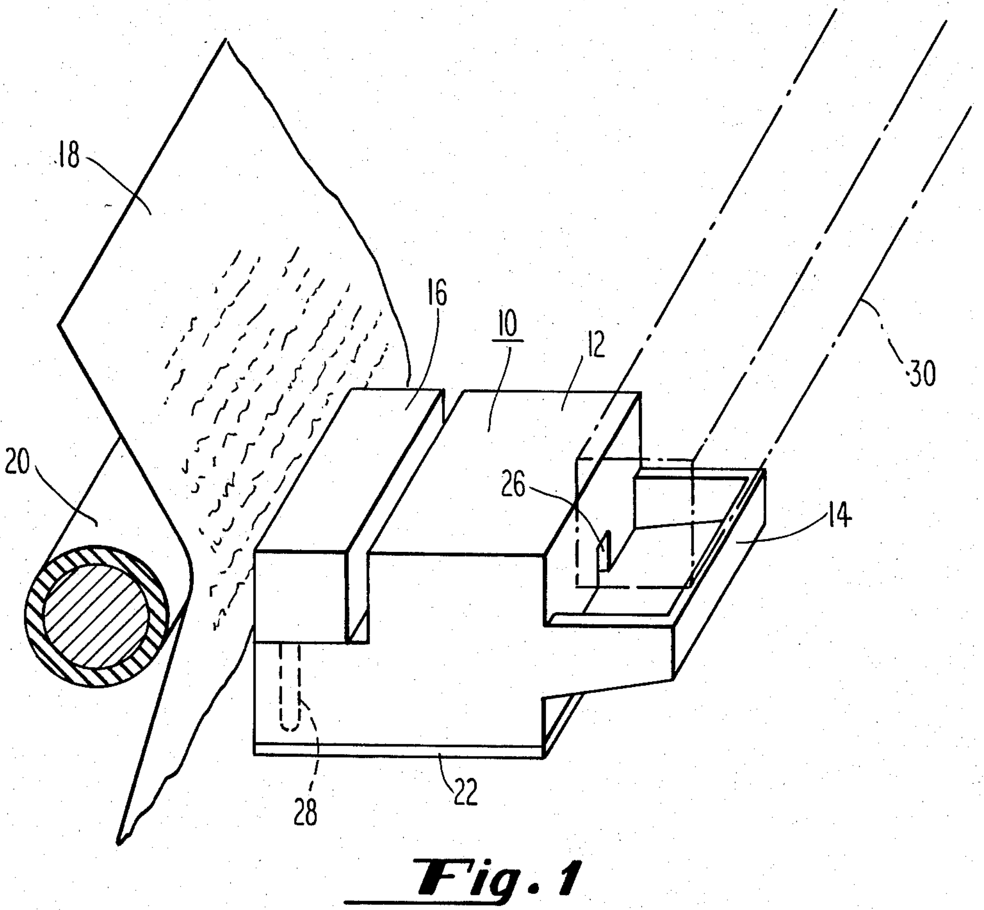
FIG. 1 is a perspective view of an ink jet apparatus which employs hot melt or phase change ink.

Referring to FIG. 1, a demand ink jet apparatus is shown comprising a movable head 10 containing a reservoir of ink 12 including a trough 14 and an imaging head 16 containing an array of ink jets. As shown in FIG. 1, the jets 16 are aligned with paper or another recording medium 18 supported by a platen 20 so as to permit droplets of ink from the imaging head 16 to contact and suitably mark the paper 18.

Figure 1A:
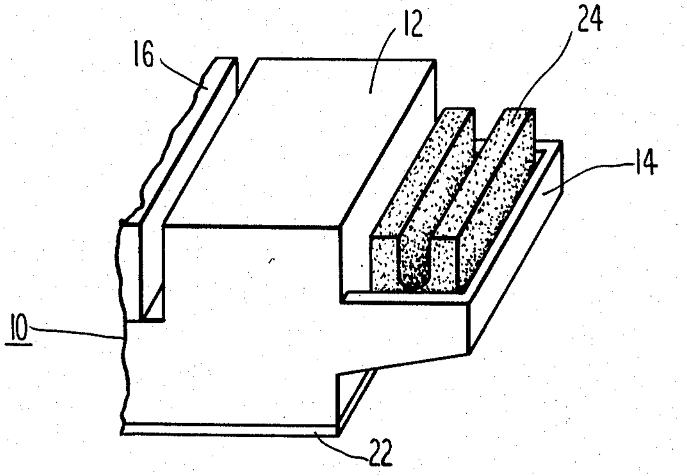
FIG. 1A is a partial perspective view of the apparatus of FIG. 1 with a pellet of hot melt ink discharged to the heated reservoir.

In accordance with the requirements of a hot melt ink jet system, the reservoir 12 including the trough 14 is raised to an elevated temperature by a heater 22 which extends along the base of the head 10. This elevation in temperature creates a sufficient amount of heat so as to melt ink in solid-state form such as the pellet 24 shown in FIG. 1A. In the trough 14, the ink will flow through an inlet 26 in the reservoir 12 and ultimately be picked up by a tube 28 shown in phantom, which extends upwardly to the imaging head 16.

In accordance with this invention, an elongated magazine or cartridge 30 is provided which extends in a direction generally parallel with the path of travel of the head 10. Elongation of the cartridge 30 in the direction shown is easily accommodated by the topography of the ink jet apparatus. In addition, the elongation provides sufficient storage capacity for pellets 24 within the cartridge itself so as to assure the minimum of operator intervention.

Figure 2:
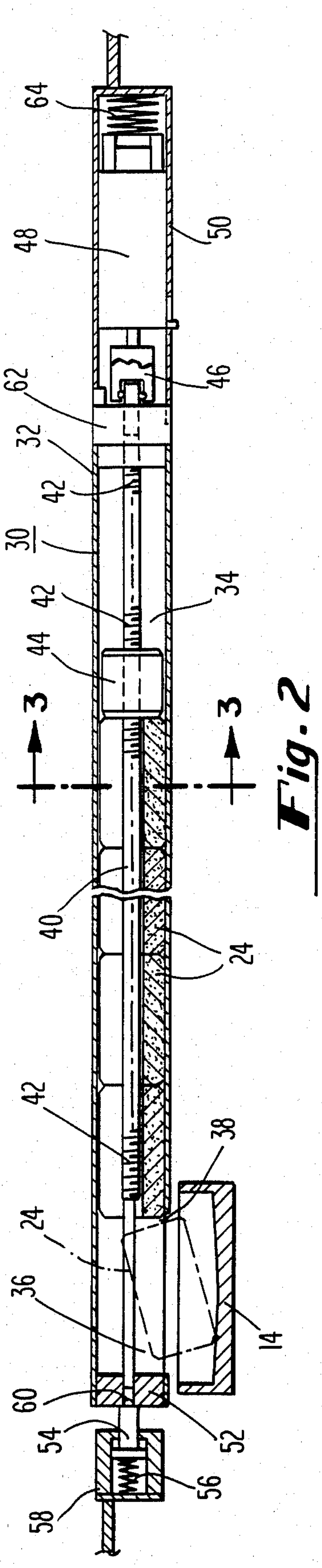
FIG. 2 is a sectional view of an ink cartridge or magazine adapted to be used in the apparatus of FIG. 1.
Figure 3:
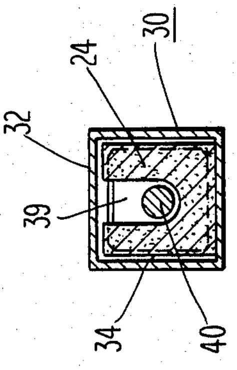
FIG. 3 is a sectional view of the apparatus of FIG. 2 taken along line 3—3.

Reference will now be made to FIGS. 2 and 3 for a more detailed discussion of the cartridge 30 in one of its preferred forms.

As shown in FIG. 2, the cartridge 30 includes a housing 32 forming a channel 34 for receiving a plurality of solid-state ink members or pellets 24 in an elongated array. Pellets 24 are adapted to advance through the channel 34 to a discharge location 36 which has an opening 38 in the channel above the trough 14. Once reaching the discharge location 36, the pellets 24 drop under the influence of gravity into the trough 14 where they melt and flow into the reservoir 12.

As shown in FIGS. 2 and 3, each of the pellets 24 is substantially square in cross-section with three flat surfaces conforming with the shape of the channel 34 and an upper surface having an axially extending opening 39 adapted to receive a rotatable drive shaft 40. The drive shaft 40 includes a series of threads 42 which extend along the shaft. A drive member 44 threadedly engages the threads 42 so as to push the mutually abutting pellets 24 along to the discharge location 36 as the drive shaft 40 rotates. Rotation of the drive shaft 40 is achieved through a coupling 46 to a motor 48 within a housing 50. The other end of the drive shaft 40 is mounted within a bearing 52.

In accordance with one important aspect of this invention, cartridge 30 is removable and may be replaced by another cartridge 30 filled with pellets 24. In this connection, a spring loaded mounting is provided in the form of a pin 54 backed by a spring 56 in a housing 58 coupled to the frame of the apparatus. Pin 54 includes a small projection 60 which extends into the end of the bearing 52 as shown in FIG. 2. Cartridge 30 is separable from the holder housing 50 at a terminus 62 of the drive shaft 40. By pushing the cartridge 30 to the left toward the housing 58, the spring 56 will be compressed and the shaft and the terminus 62 which is square or rectangular in cross-section will be withdrawn from the coupling 46 so as to permit the cartridge housing 32 to be separated from the motor housing 50. It will also be appreciated that the motor 48 is itself spring loaded within the housing 50 by a spring 64. The spring loading and the coupling of the terminus 62 permit automatic coupling regardless of the position of the shaft upon insertion of cartridge.

It will be appreciated that the blocks 24 are mutually abutting and the drive member 44 pushes on the rearmost block to advance the other blocks, all of which have a substantially uniform cross-sectional area transverse to the channel. However, it is possible to actually provide the blocks or pellets 24 with threads in an opening so as to permit the pellets 24 to be advanced individually in response to the rotation of the drive shaft as will now be discussed with reference with FIGS. 4 and 5.

Figure 6:
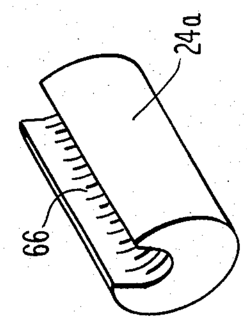
FIG. 6 is a perspective view of a solid-state ink pellet of the type employed in the embodiment of FIG. 4.
Figure 5:
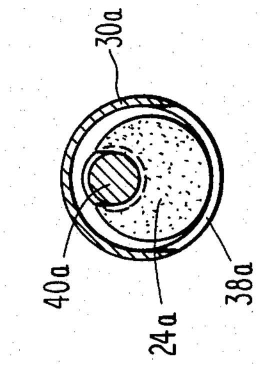
FIG. 5 is a cross-sectional view of a pellet and taken along line 5—5 of FIG. 4.
Figure 4:
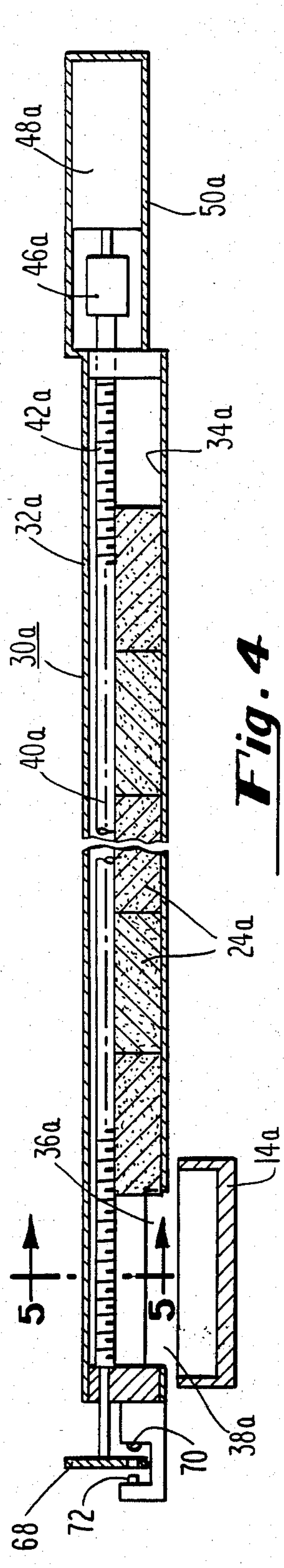
FIG. 4 is a sectional view of another embodiment of the invention.

As shown in FIG. 4, the housing 30*a* is substantially cylindrical in configuration so as to conform with substantially cylindrical pellets 24*a*. More accurately, the pellets 24*a* have a substantially arcuate surface about an axis of elongation with an opening at one portion of the surface for receiving the drive shaft 40*a*. As best shown in FIGS. 5 and 6, the threads 66 extend along the axis of elongation of the pellet 24. These threads 66 are engaged by the threads 42*a* on the rotating shaft so as to individually advance the pellets 24*a*. In other words, the threads 42*a* serve as the driving means while the threads 66 serve as the driven means.

As shown in FIG. 4, the drive shaft 40*a* is terminated in a rotating disc 68 which extends between a light source 70 and an LED 72. As the disc 68 rotates, suitable counting circuitry may be coupled to the LED 72 so as to determine the number of revolutions of the shaft 40*a* and hence the position of various pellets vis-a-vis the discharge opening 36*a*.

As also shown in FIG. 4, the motor 48*a* and the coupling 46*a* is permanently attached to the cartridge 30*a* by joining the motor housing 50*a* with the cartridge housing 32*a*. As a result removal of the cartridge 30*a* as well as its replacement involves removal and replacement of the motor 48*a*.

In the embodiments of FIGS. 1 through 6, it will be appreciated that the pellets 24 and 24*a* are aligned in a direction or path which is parallel with the axis of elongation of the individual pellets. It will also be understood that the direction or path of elongation is parallel with the motion of the head 10 as shown in FIG. 1.

Figure 7:
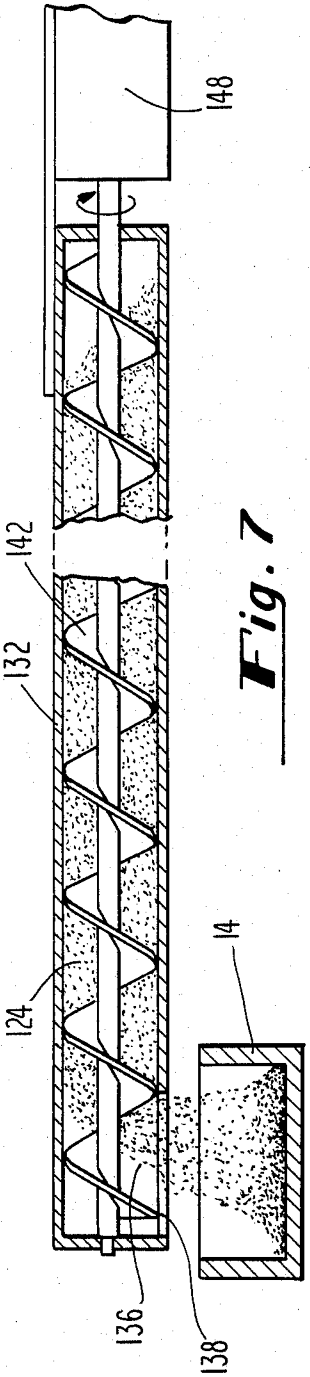
FIG. 7 is a sectional view of another embodiment of the invention employing solid-state ink in granular form.

Reference will now be made to FIG. 7 wherein the solid-state ink is in granular form. As shown in FIG. 6, a substantially cylindrical housing 130 receives an auger 142 which extends along a direction essentially parallel with the path of travel of the head 10 as shown in FIG. 1. The auger 142 is rotated by a motor 148. The interstices between the cylindrical housing 132 and the surface of the auger 142 is filled with the solid-state ink in granular form. As the auger 142 rotates, the ink 124 in granular form approaches the discharge location 136 and falls through the discharge opening 138 into the trough 14. Although not shown, a rotating counting disk and associated light source and LED may be utilized so as to control the amount of ink falling into the trough 14.

Figure 8:
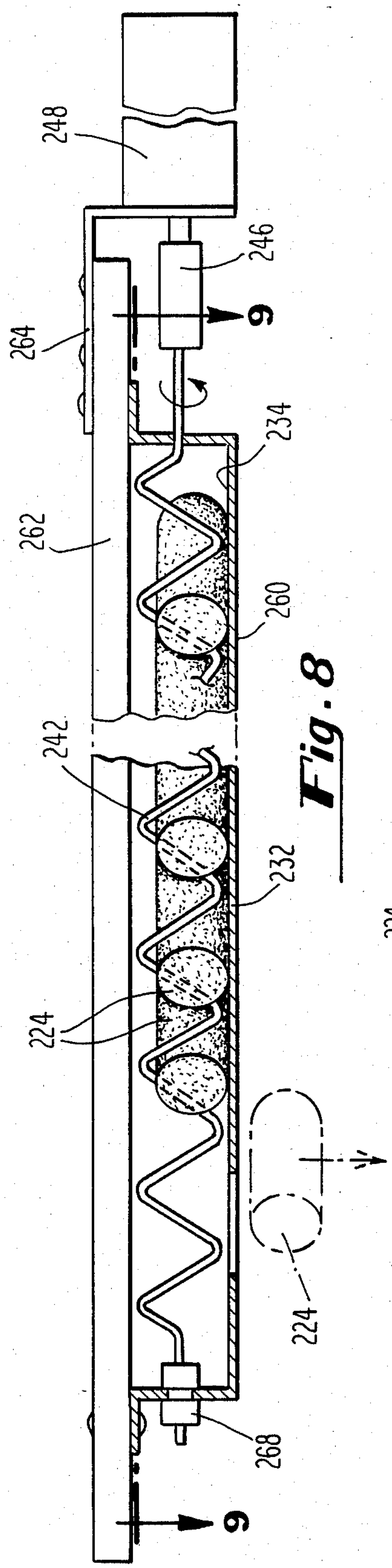
FIG. 8 is a sectional view of still another embodiment of the invention.
Figure 9:
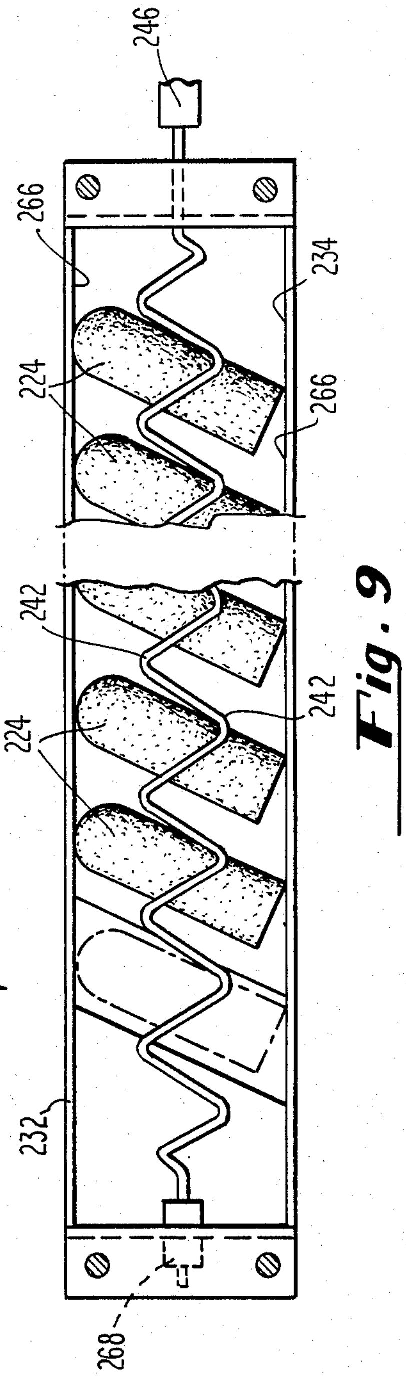
FIG. 9 is a sectional view of the apparatus of FIG. 8 taken along line 9—9.

Another embodiment of the invention is shown in FIGS. 8 and 9 wherein the cartridge is elongated. The rotatable drive shaft or helix 242 is utilized to advance bulletshaped pellets 224. As best shown in FIG. 8, each of the pellets 224 is engaged at its rear side by a turn in the helix 242. As in the earlier described embodiments, a motor 248 is employed to drive the helix 242 through a coupling 246. A housing 232 includes a sheet metal member 260 which is secured to a support plate 262. The same support plate 262 is attached to a bracket 264 which supports the motor 248. As shown in FIG. 8, the bulletshaped pellets 224 rest on the member 260 in a channel having sides 266 which engage the extremities of the elongated pellets 224. One end of the channel 234 supports the remote end of the helix 242 in a bearing 268.

As previously mentioned, the pellets 224 are bulletshaped. By this it is meant that one end of the pellets is rounded and the other end of the pellets is substantially flat. It is preferable to have at least one rounded end so as to facilitate handling of the pellet. Such a configuration allows the pellets 224 to advance through the channel 234 at an angle of less than 90° with respect to the axis of the channel and into the trough 14 minimizing the risk of hang-up.

Particular details of the head shown in FIG. 1 are disclosed in copending application, Ser. No. 661,794 filed Oct. 17, 1984, which is assigned to the assignee of this invention and incorporated herein by reference. Various details of the operation of the jets are described in detail in copending application Ser. No. 576,582, filed Feb. 3, 1984, and U.S. Pat. No. 4,459,601 which are assigned to the assignee of this invention and incorporated herein by reference. Details of the reservoir 12 are disclosed in copending application Ser. No. 661,925, filed Oct. 16, 1984, assigned to the assignee of this invention and incorporated herein by reference.

Ink which is particularly suitable for use in the pellets and granular material is discussed herein is disclosed in U.S. Pat. No. 4,390,369 and copending applications Ser. No. 610,627, filed May 16, 1984, Ser. No. 565,124, filed Dec. 23, 1983 and Ser. No. 644,542, filed Aug. 27, 1984, which is assigned to the assignee of this invention and incorporated herein by reference.

Although particular embodiments of the invention have been shown and described, it will be appreciated that various modifications may be made which will fall within the true spirit and scope of the invention as set forth in the appended claims.

I claim:

1. A method of supplying ink to a hot melt ink jet apparatus comprising an ink jet, means for moving said jet in a predetermined substantially linear direction and a heated ink reservoir coupled to said jet, said method comprising the following steps:

aligning a series of solid-state ink members in an elongated array extending along said direction above said reservoir;

advancing each of said members along a path extending through said elongated array to a discharge location at one end of said path;

dropping said members into said reservoir;

melting said solid-state ink members in said reservoir; and jetting the melted ink from said jet.

2. A method of claim 1 wherein the step of advancing includes pushing said members.

3. The method of claim 1 wherein the step of advancing includes threadedly engaging said members.

4. The method of claim 1 wherein the step of advancing includes engaging said members in granular form with an auger-like surface.

5. The method of claim 1 wherein said members comprise a series of mutually abutting and aligned pellets, said step of advancing including pushing one of said pellets which in turn pushes another of said pellets.

6. The method of claim 1 wherein said members comprise a series of pellets, said step of advancing including pushing contact with each of said pellets.

7. In an ink jet apparatus comprising an ink jet, drive means for scanning the ink jet heated ink reservoir coupled to said jet and an ink cartridge system comprising:

a plurality of solid-state ink members;

a housing forming a substantially linear channel; and a drive means for advancng-said members along a substantially linear path through said channel for discharge into said reservoir.

8. The ink jet apparatus of claim 7 wherein said drive means comprises an elongated, rotatable drive shaft extending parallel with said path, motive means for rotating said shaft about its axis and means driven by said shaft for engaging said solid-state ink members.

9. In an ink jet apparatus comprising an ink jet, drive means for scanning the ink jet, a heated ink reservoir coupled to said jet, and an ink cartridge system comprising;

a plurality of solid-state ink members;

a housing forming a substantially linear channel;

a drive means for advancing said members along a substantially linear path through said channel for discharge into said reservoir, said drive means comprising an elongated, rotatable drive shaft extending parallel with said path, motive means for rotating said shaft about its axis and means driven by said shaft for engaging said solid-state ink members, wherein each of said solid-state members comprises an opening extending along said path for receiving said shaft.

10. The ink jet apparatus of claim 8 wherein said means driven by said shaft comprises driving threads on said shaft and said members comprises driven threads threadedly engaged by said driving threads for advancing said solid-state ink member through said channel.

11. The ink jet apparatus of claim 8 wherein each of said solid-state members is elongated in the direction of said linear path.

12. The ink jet apparatus of claim 11 wherein each of said solid-state members has a substantially uniform cross-sectional area transverse to said linear path.

13. In an ink jet apparatus comprising an ink jet, drive means for scanning the ink jet, a heated ink reservoir coupled to said jet, and an ink cartridge system comprising:

a plurality of solid-state ink members;

a housing forming a substantially linear channels; and a drive means for advancing said members along a substantially linear path through said channel for discharge into said reservoir, said drive means comprising an elongated, rotatable drive shaft extending parallel with said path, motive means for rotating said shaft about its access and means driven by said shaft for engaging said solid-state ink members;

wherein each of the said solid-state members in elongated in the direction of said linear path, has a substantially uniform cross-sectional area transverse to said linear path, and include an opening extending parallel to said linear path and receiving said shaft.

14. The ink jet apparatus of claim 13 wherein said shaft includes driving threads and said opening includes driven threads engaged by said driving threads for advancing said solid-state members.

15. The ink jet apparatus of claim 8 wherein said drive means comprises a rotatable auger extending through said channel and said solid-state members are in granular form and advanced by said auger through said channel.

16. The ink jet apparatus of claim 8 wherein said drive means comprises a rotatable drive helix and said solid-state members comprise pellets engaged respectively by turns in said helix.

17. The ink jet apparatus of claim 16 wherein each of said pellets is positioned in said channel at an angle less than 90° with respect to the axis of said channel while resting on the base of said channel.

18. The ink jet apparatus of claim 17 wherein each of said pellets is elongated having a rounded end at one extremity of elongation.

19. The ink jet apparatus of claim 18 wherein each of said pellets has a flattened end at the other extremity of elongation.

20. An ink jet cartridge system comprising:

a plurality of solid-state ink members;

a housing forming a substantially linear channel; and drive means for advancing said ink members along a substantially linear path through said channel to a discharge position.

21. The cartidge of claim 20 wherein said drive means comprises an elongated, rotatable drive shaft extending parallel with said path, motive means for rotating said shaft about its axis, and means driven by said shaft for engaging said solid-state ink members.

22. An ink jet cartridge system comprising:

a plurality of solid-state ink members;

a housing forming a substantially linear channel; and drive means for advancing said ink members along a substantially linear path through said channel to a discharge position, wherein said drive means comprises an elongated, rotatable drive shaft extending parallel with said path, motive means for rotating said shaft about its access, and means driven by said shaft for engaging said solid-state ink members, each of said solid-state members comprising an opening extending along said path for receiving said shaft.

23. The ink cartridge of claim 22 wherein said means driven by said shaft comprises driving threads and said members comprise driven threads threadedly engaged by said driving threads for advancing said solid-state ink members through said channel.

24. The ink cartridge of claim 20 wherein each of said solid-state members is elongated in the direction of said path.

25. The ink cartridge of claim 24 wherein each of said solid-state members has a substantially uniform cross-sectional area transverse to said linear path.

26. The ink cartridge of claim 22 wherein said shaft includes driving threads and said opening includes driven threads engaged by said driving threads for advancing said solid-state members.

27. The ink cartridge of claim 23 wherein said drive means comprises a rotatable auger extending through said channel and said solid-state members are in granular form and advanced by said auger through said channel.

28. The ink cartridge of claim 20 wherein said drive means includes a rotatable drive helix and said solid-state members comprise pellets engaged respectively by said turns in said helix.

29. The ink cartridge of claim 28 wherein each of said pellets is positioned in said channel at an angle less than 90° while resting on the base of said channel.

30. The ink cartridge of claim 29 wherein each of said pellets is elongated having a rounded end at one extremity of elongation.

31. The ink cartridge of claim 29 wherein each of said pellets has a rounded end on at least one extremity of elongation.

32. A method of supplying ink to a hot melt ink jet apparatus comprising an ink jet, means for moving said jet in a predetermined direction and a heated ink reservoir coupled to said jet, said method comprising the following steps:

aligning a series of pellets in an elongated array extending along said direction above said reservoir, each of said pellets having threads extending therealong;

advancing each of said members along a path extending through said elongated array to a discharge location at one end of said path by threaded engagement with said threads of said pellets;

dropping said pellets into said reservoir;

melting said pellets in said reservoir; and jetting the melted ink from said jet.

33. In an ink jet apparatus comprising an ink jet, drive means for scanning the ink jet a heated ink reservoir coupled to said jet and an ink cartridge system comprising:

a plurality of solid-state ink members;

a housing including a channel forming a substantially linear array;

a drive means comprising an elongated, rotatable drive shaft extending parallel with said path including driving threads;

motive means for rotating said shaft about its axis; and means driven by said shaft for engaging said solid-state ink members, said means driven by said shaft comprising driven threads engaged by said driving threads, said means driven by said shaft pushing said solid-state ink members through said channel.

34. An ink jet cartridge comprising:

a plurality of solid-state ink members;

a housing including a channel forming a substantially linear array of said members;

drive means for advancing said ink members along a substantially linear path through said channel to a discharge position, said dirve means comprising an elongated, rotatable drive shaft extending parallel with said path, motive means for rotating said shaft about its axis;

said solid state members comprising an opening extending along said way for receiving said shaft; and means driven by said shaft comprising driving threads and a drive member including driven threads engaged by said driving threads, said drive member pushing said solid-state members through said channel.

* * * * *